United States Patent
Ding et al.

(10) Patent No.: US 12,430,905 B2
(45) Date of Patent: Sep. 30, 2025

(54) METHODS, DEVICES, AND COMPUTER READABLE MEDIA FOR TRAINING A KEYPOINT ESTIMATION NETWORK USING CGAN-BASED DATA AUGMENTATION

(71) Applicant: Huawei Technologies Co., Ltd., Guangdong (CN)

(72) Inventors: Xin Ding, Saint-Laurent (CA); Deepak Sridhar, Saint-Laurent (CA); Juwei Lu, Saint-Laurent (CA); Sidharth Singla, Saint-Laurent (CA); Peng Dai, Saint-Laurent (CA); Xiaofei Wu, Guangdong (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 328 days.

(21) Appl. No.: 18/315,866

(22) Filed: May 11, 2023

(65) Prior Publication Data
US 2023/0281981 A1    Sep. 7, 2023

Related U.S. Application Data

(63) Continuation of application No. PCT/CN2021/092938, filed on May 11, 2021.

(51) Int. Cl.
*G06V 10/82* (2022.01)
*G06V 10/776* (2022.01)

(52) U.S. Cl.
CPC ............ *G06V 10/82* (2022.01); *G06V 10/776* (2022.01)

(58) Field of Classification Search
CPC .............................. G06V 10/82; G06V 10/776
See application file for complete search history.

(56) References Cited

U.S. PATENT DOCUMENTS

| | | | | |
|---|---|---|---|---|
| 9,152,507 B1* | 10/2015 | Bushman | ............ | G06F 11/1469 |
| 9,558,422 B2* | 1/2017 | Lerios | .................... | H04N 19/27 |
| 10,867,380 B1* | 12/2020 | Pathan | ................ | G06F 16/9035 |

(Continued)

FOREIGN PATENT DOCUMENTS

| | | | | |
|---|---|---|---|---|
| CN | 112070058 A | 12/2020 | | |
| WO | WO-2019094094 A1 * | 5/2019 | ......... | G06K 9/00214 |
| WO | WO-2021242956 A1 * | 12/2021 | ............. | G06N 3/091 |

OTHER PUBLICATIONS

Busto et al., "Joint Viewpoint and Keypoint Estimation with Real and Synthetic Data" (pp. 107-121). (Year: 2019).*
Jin et al., "Drone Detection and Pose Estimation using relational Graph Networks" (pp. 1-20) (Year: 2019).*
Zhang et al., "Hand Gesture Recognition in Complex Background Based on Convolutional Pose Machine and Fuzzy Gaussian Mixture Models" (pp. 1330-1341) (Year: 2020).*

(Continued)

*Primary Examiner* — Manav Seth

(57) ABSTRACT

Method and devices for training a keypoint estimation network are described. In each training iteration, synthetic images are generated by a generator, each synthetic image being assigned respective assigned keypoints by the generator. Using a prior-iteration of the keypoint estimation network, a set of predicted keypoints is obtained for each synthetic image. Based on an error score between the predicted keypoints and the assigned keypoints, poor quality synthetic images are discarded. The remaining synthetic images, together with real world images, are used to train an updated keypoint estimation network. The performance of the updated keypoint estimation network is validated, and the training iterations are performed until a convergence criteria is satisfied.

20 Claims, 7 Drawing Sheets

(56) References Cited

U.S. PATENT DOCUMENTS

| | | | | |
|---|---|---|---|---|
| 11,182,913 | B2* | 11/2021 | Kask | G06T 7/0012 |
| 2009/0157649 | A1* | 6/2009 | Papadakis | G06F 16/5854 |
| | | | | 707/999.005 |
| 2017/0337470 | A1* | 11/2017 | DeTone | G06T 7/12 |
| 2018/0293734 | A1* | 10/2018 | Lim | G06N 3/045 |
| 2018/0336471 | A1* | 11/2018 | Rezagholizadeh | G06N 3/08 |
| 2019/0063932 | A1 | 2/2019 | Tran et al. | |
| 2019/0197358 | A1* | 6/2019 | Madani | G06N 3/045 |
| 2019/0278983 | A1 | 9/2019 | Iqbal et al. | |
| 2019/0355150 | A1* | 11/2019 | Tremblay | G06T 7/73 |
| 2020/0226421 | A1* | 7/2020 | Almazan | G06N 3/045 |
| 2020/0401835 | A1* | 12/2020 | Zhao | G06V 10/426 |
| 2022/0084204 | A1* | 3/2022 | Li | G06N 3/08 |
| 2022/0156634 | A1* | 5/2022 | Margolin | G06F 21/6245 |
| 2024/0070896 | A1* | 2/2024 | Hayashi | G06V 10/44 |
| 2024/0362926 | A1* | 10/2024 | Filimonov | G06V 10/82 |

OTHER PUBLICATIONS

Romero et al. "Embodied Hands: Modeling and Capturing Hands and Bodies Together" ACM Transactions on Graphics vol. 36 No. 6, Article 245, Nov. 2017.

Mirza et al. "Conditional Generative Adversarial Nets" arXiv:1411.1784, 2014.

Zhang et al. "Self-Attention Generative Adversarial Networks" arXiv:1805.08318, 2018.

Miyato et al. "Spectral Normalization for Generative Adversarial Networks" arXiv:1802.05957, 2018.

* cited by examiner

METHODS, DEVICES, AND COMPUTER READABLE MEDIA FOR TRAINING A KEYPOINT ESTIMATION NETWORK USING CGAN-BASED DATA AUGMENTATION

CROSS-REFERENCE TO RELATED APPLICATIONS

The present disclosure is a continuation of International Patent Application No. PCT/CN2021/092938, filed May 11, 2021, entitled "METHODS, DEVICES, AND COMPUTER READABLE MEDIA FOR TRAINING A KEYPOINT ESTIMATION NETWORK USING CGAN-BASED DATA AUGMENTATION", the entirety of which is incorporated herein by reference.

FIELD

The present disclosure is related to methods and devices for training a keypoint estimation network, in particular methods, devices, and computer readable media that use data augmentation for training the keypoint estimation network such as a hand pose estimation network.

BACKGROUND

Hand pose estimation is a machine learning task in which a keypoint estimation network (also referred to as a keypoint detection network, a pose estimation network, or a hand pose estimation network, for example) receives an image as input and outputs an estimation of the coordinates of the joints of the hand. In particular, a hand pose is often denoted by a set of keypoints (e.g., typically a set of 21 keypoints) that correspond to the joints of the hand. The keypoint estimation network performs the task of estimating the coordinates of these keypoints, from an input image that contains a human hand. The image may be a 2D image or 3D image (e.g., an RGB image, or an RGB image that includes depth data). A similar approach may be used for other pose estimation problems (e.g., human body pose estimation).

In order for the keypoint estimation network to have good performance (e.g., estimation of the keypoints with high accuracy), the network often requires training using a large number of training data samples (e.g., 10,000 data samples or more). However, training data samples typically require human annotation of the keypoints in an image (e.g., a hand image) to provide ground-truth annotation for the training data samples, which can be costly. Further, even human annotation can be difficult to perform, for example due to difficulty in correctly identifying the location of joints. The result is that a sufficiently large training dataset for training a keypoint estimation network is difficult to achieve. The limited number of training data samples results in a problem of overfitting by the trained keypoint estimation network.

Some existing approaches to address the problem of insufficient training data samples is to augment the training dataset using synthetic images (i.e., images that are computer-generated rather than collected from the real world). However, existing data augmentation techniques have not been able to generate synthetic images that are sufficiently similar (e.g., having a similar feature distribution) to real world images.

SUMMARY

In various examples, the present disclosure describes methods and devices in which a generator, which is pre-trained in a conditional generative adversarial network (cGAN), is used to generate synthetic images for augmenting a training dataset. The augmented training data set is used to train a keypoint estimation network. The keypoint estimation network is trained iteratively, and synthetic images generated by the generator are filtered by the keypoint estimation network in each iteration to help ensure the quality of the synthetic images in the augmented training dataset.

In various examples, the present disclosure provides the technical effect that a trained keypoint estimation network is obtained, where the trained keypoint estimation network trained on an augmented dataset including synthetic images. The trained keypoint estimation network is therefore less prone to the problem of overfitting.

In various examples, the present disclosure also provides the technical effect that synthetic images can be generated conditioned on keypoints sampled from real world images, without input of prior information of parameters (e.g., pose parameters, template parameters, etc.) as is required in some existing models for synthetic image generation. The synthetic images may also better correspond to real world images (e.g., having different skin textures, different skin colors, different backgrounds, different other body parts, etc.), compared to existing techniques.

A technical advantage of examples of the disclosed methods and devices is that the keypoint estimation network is trained on an augmented dataset, where the synthetic images in the augmented dataset better correspond to real world images. Further, examples of the disclosed methods and devices provide the technical advantage that a set of synthetic images is generated, in which poor quality synthetic images have been filtered out using the keypoint estimation network.

In some example aspects, the present disclosure describes a method for training a keypoint estimation network. The method includes: performing a plurality of training iterations, each training iteration including: obtaining a set of synthetic images generated by a generator, each synthetic image being assigned a respective set of assigned keypoints by the generator; using a prior-iteration keypoint estimation network, obtaining a set of predicted keypoints for each synthetic image; based on computation of an error score between the set of predicted keypoints and the respective set of assigned keypoints for each respective synthetic image: identifying and discarding any synthetic image having an error score that fails a preset threshold; and identifying and adding, to a synthetic dataset, any synthetic image having an error score that satisfies the preset threshold. Each training iteration further includes: training an updated keypoint estimation network, using a combined dataset comprising the synthetic dataset combined with a real world dataset containing real world images; and computing a mean error score for the updated keypoint estimation network, the mean error score representing performance of the updated keypoint estimation network on a validation dataset. The training iterations are performed until a convergence criteria is satisfied. The method also includes: storing the updated keypoint estimation network from a final training iteration as a final keypoint estimation network.

In the preceding example aspect of the method, the generator may be a pre-trained generator, trained using a conditional generative adversarial network (cGAN), to generate a synthetic image conditioned on a set of keypoints sampled from the real world dataset.

In some example aspects of the method, the generator may include a pre-trained sub-generator, trained using a conditional generative adversarial network (cGAN), to generate a synthetic feature vector conditioned on a set of keypoints sampled from the real world dataset. The generator may further include a decoder to reconstruct a synthetic image from the synthetic feature vector.

In any of the preceding example aspects of the method, for each training iteration the method may also include: comparing the mean error score for the updated keypoint estimation network with a mean error score computed for the prior-iteration keypoint estimation network; and, in response to a determination that the mean error score for the updated keypoint estimation network is greater than the mean error score for the prior-iteration keypoint estimation network: replacing the updated keypoint estimation network with the prior-iteration keypoint estimation network; and retraining the replaced updated keypoint estimation network using the combined dataset.

In any of the preceding example aspects of the method, for each training iteration the method may also include: based on computation of the error score between the set of predicted keypoints and the respective set of assigned keypoints for each respective synthetic image: identifying any synthetic image having an error score that satisfies the preset threshold and is within a preset margin of the threshold; replacing the set of assigned keypoints for the identified synthetic image with the set of predicted keypoints for the identified synthetic image; and adding the identified synthetic image to the synthetic dataset.

In any of the preceding example aspects of the method, the method may include: fine-tuning the final keypoint estimation network using the real world dataset.

In any of the preceding example aspects of the method, the method may include: storing the combined dataset as an augmented training dataset.

In any of the preceding example aspects of the method, the method may include: prior to a first training iteration, training an initial keypoint estimation network using only real world images. The initial keypoint estimation network may be used as the prior-iteration keypoint estimation network for the first training iteration.

In any of the preceding example aspects of the method, the convergence criteria may be a convergence of the mean error score.

In some example aspects, the present disclosure describes a device for training a keypoint estimation network. The device includes a processing unit configured to execute instructions to cause the device to: perform a plurality of training iterations, each training iteration including: obtaining a set of synthetic images generated by a generator, each synthetic image being assigned a respective set of assigned keypoints by the generator; using a prior-iteration keypoint estimation network, obtaining a set of predicted keypoints for each synthetic image; based on computation of an error score between the set of predicted keypoints and the respective set of assigned keypoints for each respective synthetic image: identifying and discarding any synthetic image having an error score that fails a preset threshold; and identifying and adding, to a synthetic dataset, any synthetic image having an error score that satisfies the preset threshold. Each training iteration also including: training an updated keypoint estimation network, using a combined dataset comprising the synthetic dataset combined with a real world dataset containing real world images; and computing a mean error score for the updated keypoint estimation network, the mean error score representing performance of the updated keypoint estimation network on a validation dataset. The training iterations are performed until a convergence criteria is satisfied. The processing unit is also configured to execute instructions to cause the computing system to: store the updated keypoint estimation network from a final training iteration as a final keypoint estimation network.

In the preceding example aspect of the device, the generator may be a pre-trained generator, trained using a conditional generative adversarial network (cGAN), to generate a synthetic image conditioned on a set of keypoints sampled from the real world dataset.

In some example aspects of the device, the generator may include a pre-trained sub-generator, trained using a conditional generative adversarial network (cGAN), to generate a synthetic feature vector conditioned on a set of keypoints sampled from the real world dataset. The generator may also include a decoder to reconstruct a synthetic image from the synthetic feature vector.

In any of the preceding example aspects of the device, the processing unit may be further configured to execute the instructions to cause the device to, for each training iteration: compare the mean error score for the updated keypoint estimation network with a mean error score computed for the prior-iteration keypoint estimation network; and in response to a determination that the mean error score for the updated keypoint estimation network is greater than the mean error score for the prior-iteration keypoint estimation network: replace the updated keypoint estimation network with the prior-iteration keypoint estimation network; and retrain the replaced updated keypoint estimation network using the combined dataset.

In any of the preceding example aspects of the device, the processing unit may be further configured to execute the instructions to cause the device to, for each training iteration: based on computation of the error score between the set of predicted keypoints and the respective set of assigned keypoints for each respective synthetic image: identify any synthetic image having an error score that satisfies the preset threshold and is within a preset margin of the threshold; replace the set of assigned keypoints for the identified synthetic image with the set of predicted keypoints for the identified synthetic image; and add the identified synthetic image to the synthetic dataset.

In any of the preceding example aspects of the device, the processing unit may be further configured to execute the instructions to cause the device to: fine-tune the final keypoint estimation network using the real world dataset.

In any of the preceding example aspects of the device, the processing unit may be further configured to execute the instructions to cause the device to: store the combined dataset as an augmented training dataset.

In any of the preceding example aspects of the device, the processing unit may be further configured to execute the instructions to cause the device to: prior to a first training iteration, train an initial keypoint estimation network using only real world images. The initial keypoint estimation network may be used as the prior-iteration keypoint estimation network for the first training iteration.

In any of the preceding example aspects of the device, the convergence criteria may be a convergence of the mean error score.

In some example aspects, the present disclosure describes a computer readable medium storing instructions thereon. The instructions, when executed by a processing unit of a device, cause the device to: perform a plurality of training iterations, each training iteration comprising: obtaining a set of synthetic images generated by a generator, each synthetic image being assigned a respective set of assigned keypoints by the generator; using a prior-iteration keypoint estimation network, obtaining a set of predicted keypoints for each synthetic image; based on computation of an error score between the set of predicted keypoints and the respective set of assigned keypoints for each respective synthetic image: identifying and discarding any synthetic image having an error score that fails a preset threshold; and identifying and adding, to a synthetic dataset, any synthetic image having an error score that satisfies the preset threshold. Each iteration further includes: training an updated keypoint estimation network, using a combined dataset comprising the synthetic dataset combined with a real world dataset containing real world images; and computing a mean error score for the updated keypoint estimation network, the mean error score representing performance of the updated keypoint estimation network on a validation dataset. The training iterations are performed until a convergence criteria is satisfied. The instructions further cause the computing system to: store the updated keypoint estimation network from a final training iteration as a final keypoint estimation network.

In any example aspects of the computer readable medium, the instructions may further cause the device to perform any of the example aspects of the method described above.

In some example aspects, the present disclosure describes a non-transitory computer readable medium storing instructions thereon. The instructions, when executed by a processing unit of a device, cause the device to: perform a plurality of training iterations, each training iteration comprising: obtaining a set of synthetic images generated by a generator, each synthetic image being assigned a respective set of assigned keypoints by the generator; using a prior-iteration keypoint estimation network, obtaining a set of predicted keypoints for each synthetic image; based on computation of an error score between the set of predicted keypoints and the respective set of assigned keypoints for each respective synthetic image: identifying and discarding any synthetic image having an error score that fails a preset threshold; and identifying and adding, to a synthetic dataset, any synthetic image having an error score that satisfies the preset threshold. Each iteration further includes: training an updated keypoint estimation network, using a combined dataset comprising the synthetic dataset combined with a real world dataset containing real world images; and computing a mean error score for the updated keypoint estimation network, the mean error score representing performance of the updated keypoint estimation network on a validation dataset. The training iterations are performed until a convergence criteria is satisfied. The instructions further cause the computing system to: store the updated keypoint estimation network from a final training iteration as a final keypoint estimation network.

In any example aspects of the non-transitory computer readable medium, the instructions may further cause the device to perform any of the example aspects of the method described above.

In some example aspects, the present disclosure describes a computer program comprising instructions which, when the program is executed by a computer, cause the computer to carry out any of the example aspects of the method described above.

BRIEF DESCRIPTION OF THE DRAWINGS

Reference will now be made, by way of example, to the accompanying drawings which show example embodiments of the present application, and in which:

FIG. 2B is a block diagram illustrating an example of a trained generator used for inference, in accordance with an example of the present disclosure;

Similar reference numerals may have been used in different figures to denote similar components.

DESCRIPTION OF EXAMPLE EMBODIMENTS

Figure 1:
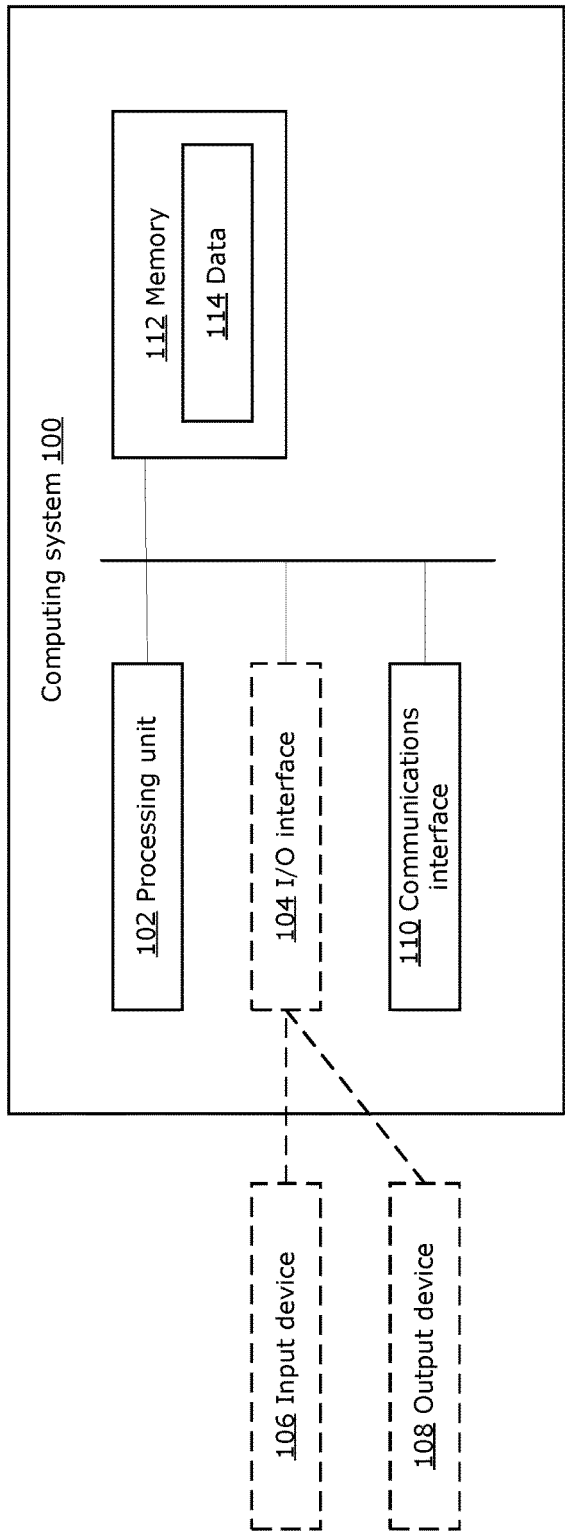
FIG. 1 is a block diagram of an example computing system which may be used to implement examples of the present disclosure.

In various examples, the present disclosure describes methods and systems that helps to address the problem of overfitting of the trained keypoint estimation network, by augmenting the training dataset with synthetic images. A deep learning model, in particular a conditional generative adversarial network (cGAN), is used to train a generator for the generation of synthetic images. A set of assigned keypoints is also automatically associated with each synthetic image. The assigned keypoints may be used as the ground-truth keypoints for the synthetic image. The synthetic images (with respective set of assigned keypoints) are used to augment the training dataset and used to iteratively train a keypoint estimation network. The synthetic images may have a feature distribution similar to or same as the feature distribution of the real world images in the training dataset. Further, the synthetic images can be generated without requiring any prior knowledge such as pose or shape parameters.

To help in understanding the present disclosure, some existing approaches for data augmentation are first described.

An existing technique for augmenting the training dataset with synthetic images uses a mathematical hand model referred to as MANO (which stands for hand Model with Articulated and Non-rigid deformations; described by Romero et al. "Embodied Hands: Modeling and Capturing Hands and Bodies Together" *ACM Transactions on Graphics* Vol. 36 No. 6, Article 245, November 2017"). For the generation of the synthetic images, many input parameters (e.g., shape, pose, template etc.) to the MANO model need to be known. However, it may be difficult to obtain or calculate the appropriate value of these parameters. Further, the MANO model is designed to only model human hands, and cannot generate synthetic images that include other background objects (e.g., human arms, clothing, faces etc.). Accordingly, the generated synthetic images may not correspond well with real world images. Further, the skin texture of hands in the MANO-generated synthetic images have been found to differ from that of real human hands in real world images. The result is that synthetic images generated using the MANO model may not be suitable for augmenting the training dataset.

The present disclosure describes example methods and systems that uses a generator, trained using a cGAN, to generate synthetic images for augmenting the training dataset. The augmented training dataset is used to iteratively train a keypoint estimation network. Further, the keypoint estimation network is used in each iteration to filter the synthetic images and to optionally adjust the assigned keypoints, to help ensure the quality of the synthetic images and assigned keypoints. The disclosed methods and systems enable generation of synthetic images without prior knowledge of input parameters (e.g., shape or pose parameters), and is not limited to generation of human hand images. For example, the disclosed example methods and systems may also be used to generate synthetic images, such as images including human bodies, images including human faces, images including vehicles, or images of other objects that have keypoint information, and for iteratively training a keypoint estimation network using such synthetic images.

For simplicity, the following discussion will describe some examples in the context of synthetic image generation and keypoint estimation for estimation of human hand pose. However, it should be understood that the present disclosure is also applicable to other keypoint estimation problems, such as estimation of human body poses, estimation of human facial expressions, or estimation of vehicle poses, among other possibilities.

FIG. 1 is a block diagram illustrating a simplified example implementation of a computing system 100 that is suitable for implementing embodiments described herein. Examples of the present disclosure may be implemented in other computing systems, which may include components different from those discussed below. Although FIG. 1 shows a single instance of each component, there may be multiple instances of each component in the computing system 100. The computing system 100 may be used to execute instructions for training a neural network model, using any of the examples described above. The computing system 100 may also to execute the trained neural network model, or the trained neural network model may be executed by another computing system.

Although FIG. 1 shows a single instance of each component, there may be multiple instances of each component in the computing system 100. Further, although the computing system 100 is illustrated as a single block, the computing system 100 may be a single physical machine or device (e.g., implemented as a single computing device, such as a single workstation, single consumer device, single server, etc.), or may comprise a plurality of physical machines or devices (e.g., implemented as a server cluster). For example, the computing system 100 may represent a group of servers or cloud computing platform providing a virtualized pool of computing resources (e.g., a virtual machine, a virtual server).

The computing system 100 includes at least one processing unit 102, such as a processor, a microprocessor, a digital signal processor, an application-specific integrated circuit (ASIC), a field-programmable gate array (FPGA), a dedicated logic circuitry, a dedicated artificial intelligence processor unit, a graphics processing unit (GPU), a tensor processing unit (TPU), a neural processing unit (NPU), a hardware accelerator, or combinations thereof.

The computing system 100 may include an optional input/output (I/O) interface 104, which may enable interfacing with an optional input device 106 and/or optional output device 108. In the example shown, the optional input device 106 (e.g., a keyboard, a mouse, a microphone, a touchscreen, and/or a keypad) and optional output device 108 (e.g., a display, a speaker and/or a printer) are shown as optional and external to the computing system 100. In other example embodiments, there may not be any input device 106 and output device 108, in which case the I/O interface 104 may not be needed.

The computing system 100 may include an optional network interface 110 for wired or wireless communication with other computing systems (e.g., other computing systems in a network). The network interface 110 may include wired links (e.g., Ethernet cable) and/or wireless links (e.g., one or more antennas) for intra-network and/or inter-network communications. For example, the network interface 110 may enable the computing system 100 to access training data samples from an external database, or a cloud-based datacenter (among other possibilities) where training datasets are stored. The network interface 110 may enable the computing system 100 to communicate trained parameters (e.g., weight values) of a trained keypoint estimation network to another computing system (e.g., an edge computing device or other end consumer device) where the trained keypoint estimation network is to be deployed for inference.

The computing system 100 may include a memory 112, which may include a volatile or non-volatile memory (e.g., a flash memory, a random access memory (RAM), and/or a read-only memory (ROM)). The non-transitory memory 112 may store instructions for execution by the processing unit 102, such as to carry out examples described in the present disclosure. For example, the memory 112 may store instructions for implementing any of the networks and methods disclosed herein. The memory 112 may include other software instructions, such as for implementing an operating system and other applications/functions. The memory 112 may also include data 114, such as trained parameters (e.g., weight values) of a neural network.

In some examples, the computing system 100 may also include an electronic storage unit (not shown), such as a solid state drive, a hard disk drive, a magnetic disk drive and/or an optical disk drive. In some examples, data and/or instructions may be provided by an external memory (e.g., an external drive in wired or wireless communication with the computing system 100) or may be provided by a transitory or non-transitory computer-readable medium. Examples of non-transitory computer readable media include a RAM, a ROM, an erasable programmable ROM (EPROM), an electrically erasable programmable ROM (EEPROM), a flash memory, a CD-ROM, or other portable memory storage. The components of the computing system 100 may communicate with each other via a bus, for example.

The present disclosure describes an example method for iteratively training a keypoint estimation network, denoted as f, using a training dataset. The training dataset is augmented by synthetic images generated using a generator. The generator is pre-trained in a cGAN that is conditioned on keypoints. In each training iteration, the keypoint estimation network f is used to filter out poor quality synthetic images. The remaining good quality synthetic images are used to augment the training dataset, and an updated keypoint estimation network (denoted as f') is trained using the augmented training dataset. The training iterations are repeated until the updated keypoint estimation network f' satisfies a performance criterion. The updated keypoint estimation network f' is stored as the final trained keypoint estimation network. The trained keypoint estimation network may be used to generate keypoint estimations during inference. The generator, and the cGAN for training the generator, will be described first.

A generative adversarial network (GAN) is a deep learning model, and can be used to train a generator. A GAN typically includes both a generator and a discriminator, each of which may be an independent neural network (e.g., a deep neural network (DNN) or a convolutional neural network (CNN)) in the GAN. Training the GAN involves training the generator to generate synthetic data that mimics real world data and training the discriminator to accurately predict whether data is synthetic or real world data. Typically, the generator receives random noise as input, and generates synthetic data as output. The discriminator receives input that includes both synthetic data (generated by the generator) and real world data (e.g., sampled from a training dataset). The discriminator generates a predicted output that represents the probability that a given input data is real world data.

Conceptually, the generator and discriminator "compete" against each other. The goal is to obtain a trained generator that is able to generate synthetic data that cannot be distinguished from real world data by the discriminator. The trained generator may then be used for generating synthetic data (e.g., to augment a training dataset) and the trained discriminator may not be needed.

A cGAN is a type of GAN in which the generator generates synthetic data using some conditional information in addition to random noise as input. The generator generates synthetic data conditioned on the conditional information, thus enabling some control over the synthetic data that is generated. For example, if the conditional information is a class label, the generator is conditioned to generate synthetic data belonging to that class, rather than belonging to any random class. In the present examples, where the generator generates synthetic images that include human hands, the conditional information may include information specifying a particular hand pose for each synthetic image, as discussed further below.

Figure 2A:
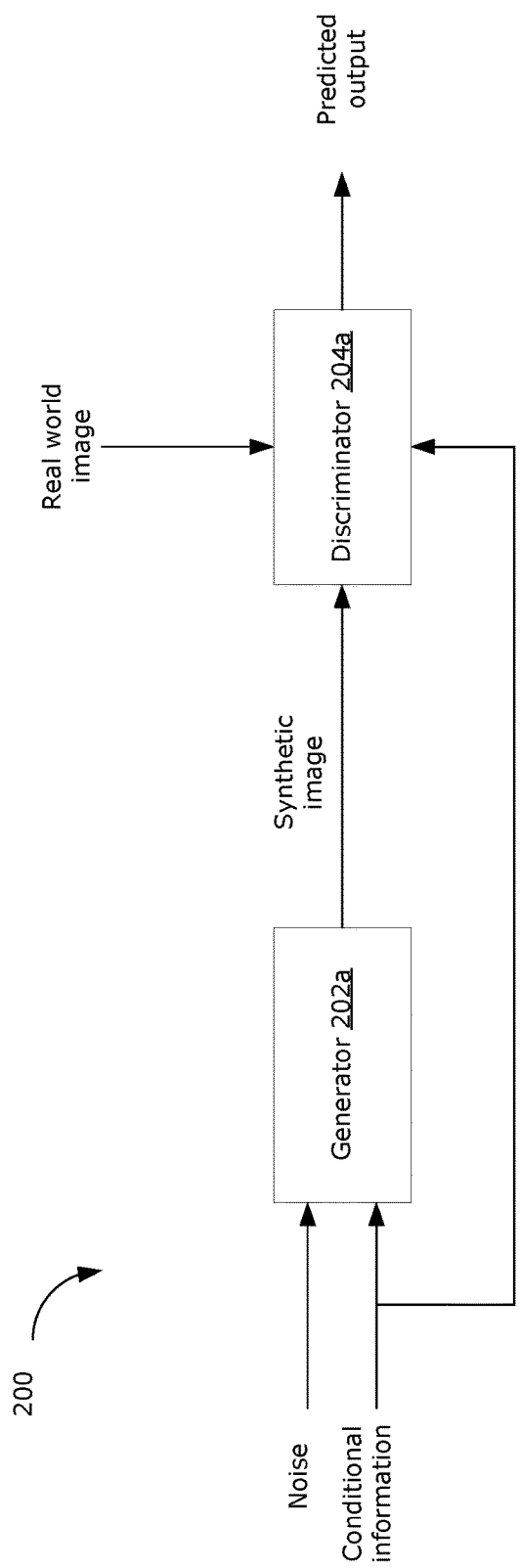
FIG. 2A is a block diagram illustrating an example cGAN architecture for training a generator, in accordance with an example of the present disclosure.

FIG. 2A is a block diagram of a first cGAN architecture 200 that may be used to train a generator for generating synthetic images conditioned on keypoints.

The cGAN architecture 200 includes a generator 202a and a discriminator 204a. Any suitable network architecture (e.g., SAGAN as described by Zhang et al. "Self-Attention Generative Adversarial Networks" arXiv:1805.08318, 2018; SNGAN as described by Miyato et al. "Spectral Normalization for Generative Adversarial Networks" arXiv: 1802.05957, 2018; or other CNN architecture) can be used for the generator 202a and discriminator 204a.

The generator 202a receives as input random noise (e.g., Gaussian random noise, or uniform random noise) and conditional information. The conditional information includes a set of keypoint (e.g., in the form of a keypoint vector containing the value of each keypoint) that represents a real world pose (e.g., the ground-truth set of keypoints assigned to a real world data sample). In an example where the generator 202a is trained to generate synthetic images that include human hands, the set of keypoints in the conditional information may be a set of 21 values for the respective 21 keypoints of a hand pose. The generator 202a may also receive additional conditional information (e.g., a skin color label, a skin texture label, a background label, a left/right hand label, etc.) as input. The additional conditional information may or may not be sampled from real world images.

The discriminator 204a receives synthetic images (generated by the generator 202a) or real world images (sampled from a training dataset) as input, as well as the conditional information. The discriminator 204a generates predicted output that classifies the images as synthetic or real world images.

In each training iteration of the cGAN architecture 200, the parameters (e.g., weight values) of the discriminator 204a are fixed and the generator 202a is trained (e.g., the weight values of the generator 202a are updated by computing a loss and backpropagating the loss gradient), then the parameters (e.g., weight values) of the generator 202a are fixed and the discriminator 204a is trained (e.g., the weight values of the discriminator 204a are updated by computing a loss and backpropagating the loss gradient). The training iterations are repeated until the generator 202a is able to generate synthetic images that cannot be distinguished from real world images by the discriminator 204a.

The trained generator 202a may then be used to generate synthetic images, as illustrated in FIG. 2B.

The trained generator 202a receives random noise and conditional information as input, and generates a synthetic image that includes a pose (e.g., a hand pose, body pose, vehicle pose, facial expression, etc.) conditioned on the conditional information. Unlike the MANO model, the trained generator 202a is also able to generate different backgrounds for the pose.

Figure 3A:
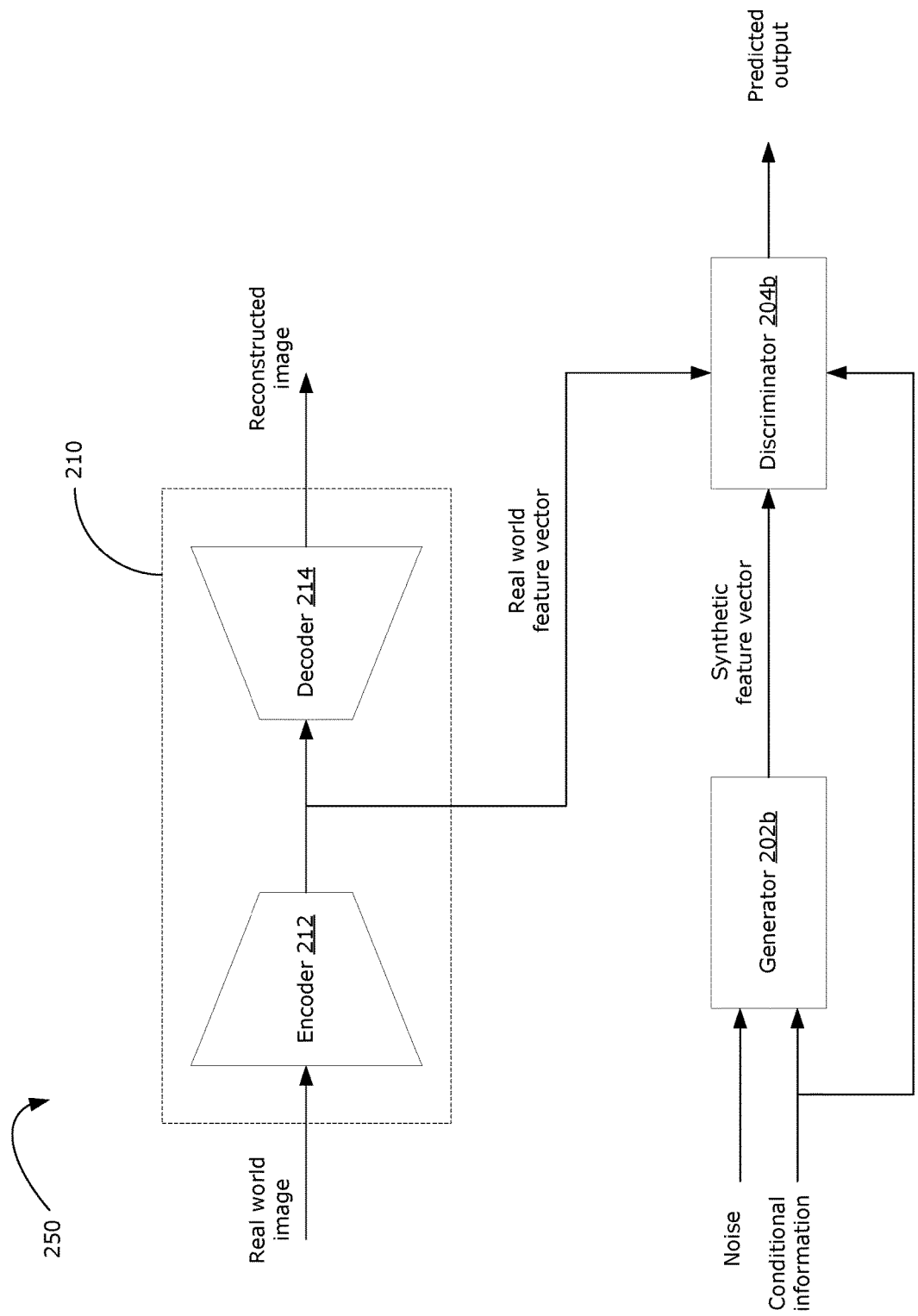
FIG. 3A is a block diagram illustrating an example cGAN architecture, including an autoencoder, for training a generator, in accordance with an example of the present disclosure.

FIG. 3A is a block diagram of a second cGAN architecture 250 that may be used to train a generator for generating synthetic images conditioned on keypoints.

The cGAN architecture 250 includes a generator 202b and a discriminator 204b, which may have any suitable network architecture, similar to the generator 202a and discriminator 204a of FIG. 2A. The second cGAN architecture 250 includes a pre-trained autoencoder 210, which includes a trained encoder 212 and a trained decoder 214 (which may be simply referred to as the encoder 212 and the decoder 214, with the understanding that both are pre-trained).

The input to the encoder 212 is a real world image and the output of the encoder 212 is a feature vector, which is a vector representation of the features of an image data. Because the feature vector is encoded from a real world image, the feature vector outputted by the encoder 212 may be referred to as a real world feature vector. It should be understood that the real world feature vector may more generally be referred to as a real world feature representation (i.e., is not necessarily limited to vector format). The decoder 214 receives the feature vector as input and outputs a reconstructed image.

Unlike the first cGAN architecture 200, the generator 202b in the second cGAN architecture 250 is trained to generate synthetic feature vectors, instead of generating synthetic images directly, conditional on the conditional information (e.g., including a set of keypoints and possibly additional conditional information, similar to the first cGAN architecture 200). The discriminator 204b receives synthetic feature vectors (from the generator 202b) or real world feature vectors (from the encoder 212) as input, as well as the conditional information. The discriminator 204b generates a predicted output that classifies the feature vectors as synthetic or real world feature vectors.

Training of the second cGAN architecture 250 may be performed similarly to the training of the first cGAN architecture 200 described above. The training iterations are repeated until the generator 202b is able to generate synthetic feature vectors that cannot be distinguished from real world feature vectors by the discriminator 204b. The decoder 214 may not be needed during training of the generator 202*b*, however the decoder 214 is used when the trained generator 202*b* is deployed for generating synthetic images, as discussed below.

Figure 3B:
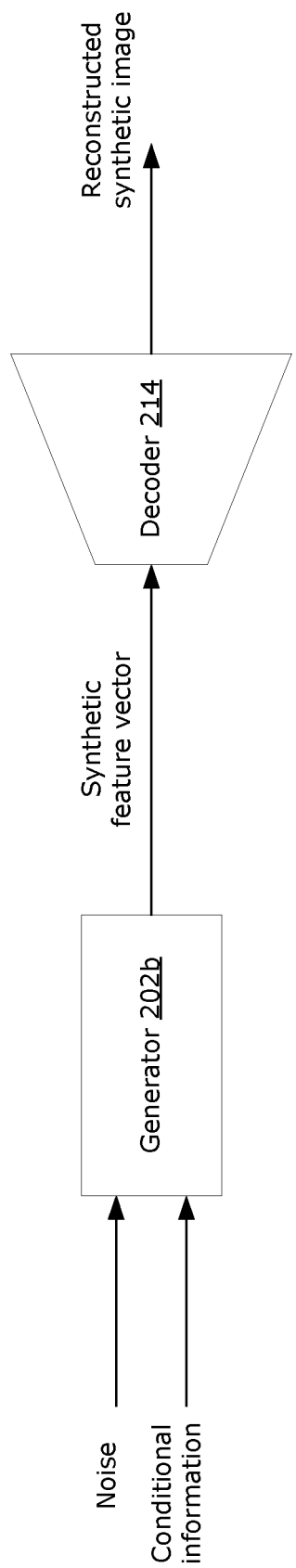
FIG. 3B is a block diagram illustrating an example of a trained generator and decoder used for inference, in accordance with an example of the present disclosure.

FIG. 3B illustrates an examples of how the trained generator 202*b* may be deployed for generating synthetic images.

The trained generator 202*b* receives random noise and conditional information as input, and generates a synthetic feature vector conditioned on the conditional information. The synthetic feature vector is inputted to the decoder 214, and the decoder 214 outputs the reconstructed synthetic image (shown in FIG. 3A). It should be noted that the decoder 214 used during deployment and the encoder 212 used during training are part of the same autoencoder 210, however the decoder 214 may be used in deployment separately and independently of the encoder 212.

Compared to the first cGAN architecture 200 (as shown in FIG. 2A), an advantage of the second cGAN architecture 250 (as shown in FIG. 3A) is that feature vectors are computationally less expensive (e.g., requiring fewer memory resources, fewer computations, etc.) to generator (by the generator 202*b*) and to process (by the discriminator 204*b*) compared to images. For example, 2D and 3D images typically have higher dimensions than feature vectors. Further, a greater number of training iterations may be required to train the generator 202*a* using the first cGAN architecture 200, compared to training the generator 202*b* using the second cGAN architecture 250. However, the quality of the synthetic images (by the deployment of the generator 202*b* with the decoder 214) is dependent on how well the autoencoder 210 performs. Further, the need to include the decoder 214 with the generator 202*b* in deployment may be more computationally expensive (e.g., requiring more memory resources, more computations, etc.) compared to deployment of the generator 202*a* by itself. Nonetheless, synthetic images generated by the generator 202*a* or the generator 202*b* with the decoder 214 may be more similar to real world images (e.g., including different backgrounds, different skin colors and textures, etc.) compared to existing synthetic image generation techniques such as the MANO model.

It should be noted that, although the generator 202*a*, 202*b* is trained to generate synthetic images conditioned on existing keypoints (sampled from real world images), the synthetic images still introduce variation that is useful for augmenting the real world images. For example, the generator 202*a*, 202*b* may generate synthetic images with different backgrounds (e.g., introducing different background objects, different body parts, different background contexts, etc.), or different hands (e.g., different skin colors, different skin textures), among other possibilities. In other words, the generator 202*a*, 202*b* generates synthetic images in which information other than keypoint information can be variable. Training a keypoint estimation network using such images may help to train the keypoint estimation network to ignore this irrelevant background information and to learn features specific to keypoint estimation.

The keypoint estimation network and training of the keypoint estimation network are now discussed.

Figure 4:
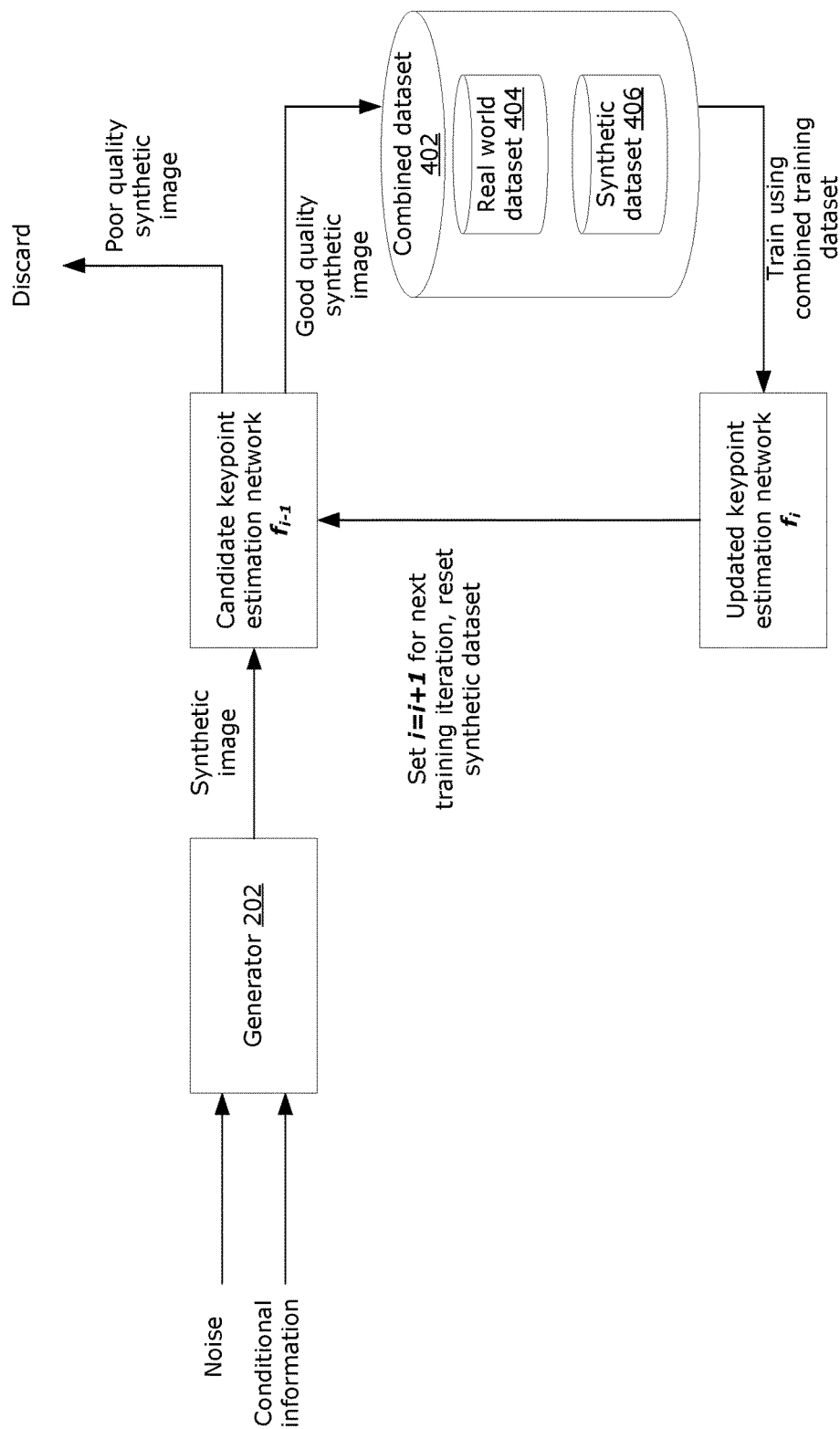
FIG. 4 is a block diagram illustrating an example dataflow for iteratively training a keypoint estimation network, in accordance with an example of the present disclosure.

FIG. 4 is a block diagram illustrating an example dataflow for iteratively training the keypoint estimation network, in accordance with an example of the present disclosure.

FIG. 4 includes a generator 202 that receives random noise and conditional information as input and generates synthetic images as output. The generator 202 may be trained using the first cGAN architecture 200 or the second cGAN architecture 250, as described above. Thus, the generator 202 may be the generator 202*a*; or the generator 202 may comprise the generator 202*b* (which may be referred to as the sub-generator 202*b* of the generator 202) together with the decoder 214 (in which case, the sub-generator 202*b* and the decoder 214 may together be considered to be a single network; or the sub-generator 202*b* and the decoder 214 may be separate networks that together form the generator 202). The generator 202 may be any other suitable generator capable of generating synthetic images, and is not necessarily limited to the examples described herein.

Synthetic images generated by the generator 202 may be added to a synthetic dataset 406 (i.e., a dataset of synthetic images). The synthetic dataset 406 may be combined with a real world dataset 404 (i.e., a dataset of real world images) in a combined dataset 402. The combined dataset 402 may be considered an augmentation of the real world dataset 404. The generator 202 may be trained using the real world dataset 404, or a different training dataset. As described above, the generator 202 generates a synthetic image conditional on a set of keypoints included in the conditional information. The set of keypoints in the conditional information is assigned to the generated synthetic image and is considered to be the ground-truth set of keypoints for the synthetic image.

FIG. 4 also includes a keypoint estimation network that is iteratively trained. The keypoint estimation network may be updated (e.g., parameters, such as weight values, of the keypoint estimation network may be updated, based on computed loss gradients) each iteration, as discussed further below. Further details of FIG. 4 will be discussed together with discussion of FIG. 5.

Figure 5:
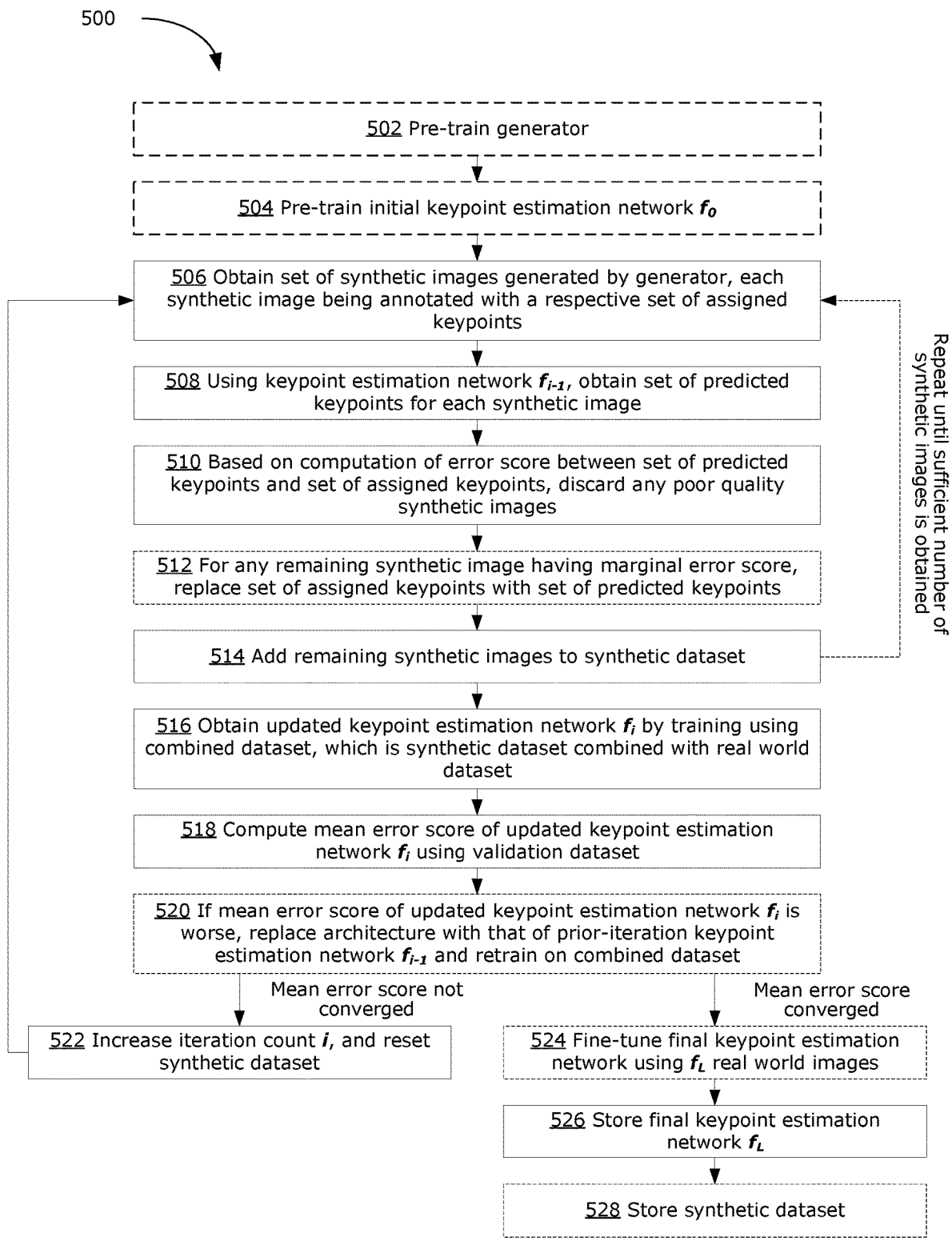
FIG. 5 is a flowchart for iteratively training a keypoint estimation network, in accordance with an example of the present disclosure.

FIG. 5 is a flowchart illustrating an example method 500 for training the keypoint estimation network. The method 500 may be performed by the computing system 100. For example, the processing unit 102 may execute computer readable instructions (which may be stored in the memory 112) to cause the computing system 100 to perform the method 500. The method 500 may be performed using a single physical machine (e.g., a workstation or server), a plurality of physical machines working together (e.g., a server cluster), or cloud-based resources (e.g., using virtual resources on a cloud computing platform).

Optionally, at 502, the generator 202 is pre-trained. For example, if the generator 202 is the generator 202*a* of FIG. 2B, the first cGAN architecture 200 may be used to train the generator 202*a*. If the generator 202 is the sub-generator 202*b* together with the decoder 114 (as shown in FIG. 3B), the second cGAN architecture 250 may be used. Any other suitable generator model may be used to pre-train the generator 202. The generator 202 may be pre-trained using the real world dataset 404, or a different training dataset. In some examples, pre-training of the generator 202 may be performed prior to the method 500 (e.g., the generator 202 may have been pre-trained on a separate computing system), and step 502 may be omitted.

Optionally, at 504, an initial keypoint estimation network, denoted to, is pre-trained. The initial keypoint estimation network to is pre-trained using real world images (e.g., using the real world dataset 404 or a different training dataset). The initial keypoint estimation network to may be any suitable neural network that has been developed for keypoint estimation, depending on the type of keypoints to be estimated (e.g., keypoints for hand pose estimation, keypoints for body pose estimation, keypoints for facial expression estimation, keypoints for vehicle pose estimation, etc.).

Performance of the initial keypoint estimation network to may be evaluated on a validation dataset. The validation dataset is a set of real world images (which may be from the real world dataset 404 or the different training dataset that was used to pre-train the initial keypoint estimation network to, and reserved for validation purposes). To evaluate performance of the initial keypoint estimation network to, the trained initial keypoint estimation network to is used to generate a set of predicted keypoints for each real world image sampled from the validation dataset. An average error score is then computed by computing the error between the set of predicted keypoints and the ground-truth set of keypoints assigned to the respective real world image, and averaging over the validation dataset. The average error score may be used as an indication of the validation performance of the initial keypoint estimation network to, where a lower average error score indicates a better validation performance. Various techniques may be used to compute the average error score. For example, metrics that have been developed for evaluating accuracy of keypoint estimation (e.g., for estimation of human body pose, or estimation of human hand pose) include percentage of correct parts (PCP), percentage of correct key-points (PCK), percentage of detected joints (PDJ), and mean per joint position error (MPJPE), among others (e.g., other metrics may be used for evaluating accuracy of keypoint estimation for estimating facial expression or for estimating vehicle pose). Any of these metrics may be used as an average error score. In examples described below, MPJPE is used to compute the average error score, although this is not intended to be limiting.

MPJPE is the L2 norm (also referred to as the Euclidean norm) between the vector containing predicted keypoints (also referred to as the predicted keypoint vector) and the vector containing ground-truth keypoints (also referred to as the ground-truth keypoint vector), averaged over all keypoints (or joints). A lower MPJPE score means that the set of predicted keypoints is closer to the ground-truth set of keypoints, and if the MPJPE score is zero this means the set of predicted keypoints is the same as the ground-truth set of keypoints. The mean MPJPE score (averaged over all data samples in the validation dataset) may be computed using the following equation:

$$\text{Mean } MPJPE \text{ Score} = \frac{1}{n}\sum_{i=1}^{n}\frac{1}{J}\sum_{j=1}^{J}\|u_{gt\,i}^{j} - u_{pred\,i}^{j}\|$$

where n is the number of data samples in the validation dataset, J is the number of keypoints (e.g., J is typically 21 or 14 (depending on dataset used) in the case of hand pose estimation), $u_{gt\,i}^{j}$ is the ground-truth keypoint for the j-th joint in the i-th data sample, and $u_{pred\,i}^{j}$ is the predicted keypoint for the j-th joint in the i-th data sample.

In some examples, pre-training of the initial keypoint estimation network $f_0$ may be performed prior to the method 500 (e.g., the initial keypoint estimation network $f_0$ may have been pre-trained on a separate computing system), and step 504 may be omitted.

Regardless of whether steps 502 and 504 are performed, after the pre-trained generator 202 and the pre-trained initial keypoint estimation network $f_0$ are obtained, training of the keypoint estimation network is performed iteratively. For generality, a given training iteration may be referred to as the i-th training iteration. The updated keypoint estimation network that is obtained at the end of the i-th training iteration is denoted as $f_i$, and the keypoint estimation network from the immediately prior training iteration (i.e., the (i−1)-th iteration) is denoted as $f_{i-1}$. In the case of the first training iteration (i.e., i=1), the prior-iteration keypoint estimation network $f_{i-1}$ is the pre-trained initial keypoint estimation network $f_0$.

At 506, a set of synthetic images is obtained. The set of synthetic images is generated by the generator 202, and each synthetic image is annotated with a respective set of assigned keypoints. A large number (e.g., 1,000 images or more) of synthetic images may be obtained at step 506, with the assumption that some generated synthetic images will be filtered out and discarded later.

The generator 202 receives as input random noise and conditional information (e.g., as illustrated in FIGS. 2B and 3B). The conditional information includes a set of keypoints, and the generator 202 generates a synthetic image conditioned on the set of keypoints (and additional conditional information if any) included in the conditional information. The set of keypoints included in the conditional information may be the set of ground-truth keypoints of a real world image sampled from the real world dataset 404 (or other dataset). The set of keypoints in the conditional information is assigned to the generated synthetic image. The set of keypoints included in the conditional information may be randomly sampled for generation for each synthetic image, such that the set of synthetic images generated at step 506 may have a keypoint distribution that corresponds to the keypoint distribution of the real world dataset 404.

At 508, a set of predicted keypoints is obtained for each synthetic image generated at step 506. The prior-iteration keypoint estimation network is used to predict the set of predicted keypoints for each synthetic image, for example by forward propagating each synthetic image through the prior-iteration keypoint estimation network $f_{i-1}$.

At 510, for each synthetic image, an error score is computed between the set of predicted keypoints (generated at step 508) and the set of assigned keypoints (assigned at step 506). For example, the MPJPE between the set of predicted keypoints and the set of assigned keypoints may be computed as the error score, as follows:

$$MPJPE \text{ Score} = \frac{1}{J}\sum_{j=1}^{J}\|u_{pred\,i}^{j} - u_{assign\,i}^{j}\|$$

where $u_{pred\,i}^{j}$ is the predicted keypoint for the j-th joint in the i-th synthetic image, and $u_{assign\,i}^{j}$ is the assigned keypoint for the j-th joint in the i-th synthetic image. It may be noted that the MPJPE score represented in the above equation is the MPJPE score computed for one synthetic image, and differs from the mean MPJPE score (which is averaged over a plurality of images).

Based on the computed error score, any poor quality synthetic images are discarded. A synthetic image may be considered a poor quality synthetic image if the computed error score does not satisfy (e.g., is larger than) a preset threshold. The preset threshold may be selected dependent on the quality of the real world dataset 404 to be augmented and/or dependent on the number of synthetic images desired, for example (e.g., the preset threshold may be increased if too many synthetic images are filtered out by the threshold). The remaining synthetic images may be considered good quality synthetic images.

Optionally, at step 512, for any remaining synthetic image that has a marginal error score, the set of assigned keypoints (assigned at step 506) may be replaced with the set of predicted keypoints (generated at step 508). A marginal error score may be an error score that satisfies (e.g., is equal to or less than) the preset threshold, but is close to (e.g., within a preset margin of, such as within 10% of or within 10 points of) the present threshold. A marginal error score may indicate that the synthetic image is of acceptably good quality, but that the set of assigned keypoints should be adjusted. The set of predicted keypoints may thus be used to replace the set of assigned keypoints.

At 514, the remaining good quality synthetic images (i.e., the synthetic images remaining after discarding poor quality synthetic images at step 510) are added to the synthetic dataset 406. Each synthetic image is associated with a respective set of keypoints (e.g., the set of assigned keypoints from step 506, or the set of predicted keypoints if step 512 is performed) as the ground-truth keypoints for that synthetic image. The synthetic dataset 406 may be used to augment the real world dataset 404, for example by combining the real world dataset 404 and the synthetic dataset 406 into a combined dataset 402.

Optionally, if the synthetic dataset 406 does not have a sufficient number of synthetic images (e.g., if a large number of poor quality synthetic images was discarded from the generated set of synthetic images), the method 500 may return to step 506 to obtain more synthetic images. The steps 506-514 may be performed repeatedly until a sufficient number of synthetic images has been obtained. For example, steps 506-514 may be repeated until the synthetic dataset 406 contains at least a preset target number of synthetic images. In another example, steps 506-514 may be repeated until a preset target ratio between the number of real world images in the real world dataset 404 and the number of synthetic images in the synthetic dataset 406 has been achieved.

At 516, an updated keypoint estimation network $f_i$ is obtained, by training using the combined dataset 402 (which is the combination of the real world dataset 404 with the synthetic dataset 406). The updated keypoint estimation network $f_i$ may be obtained by retraining the prior-iteration keypoint estimation network $f_{i-1}$ using the combined dataset 402. Alternatively, the updated keypoint estimation network $f_i$ may be obtained by training a different keypoint estimation network (e.g., having a different network architecture than the prior-iteration keypoint estimation network $f_{i-1}$). If the network architecture of the prior-iteration keypoint estimation network $f_{i-1}$ is not used for the updated keypoint estimation network $f_i$, the architecture of the updated keypoint estimation network $f_i$ may have a complexity that is greater than or equal to that of the prior-iteration keypoint estimation network $f_{i-1}$. If a different network architecture is used for the updated keypoint estimation network $f_i$, the different network architecture may be an automatically generated network architecture (e.g., automatically generated by adding an additional layer to the network architecture of the prior-iteration keypoint estimation network $f_{i-1}$), may be automatically selected from a database of available network architectures (e.g., various architectures may be stored and ranked by complexity in a database), or may be manually selected, for example.

At 518, the performance of the updated keypoint estimation network $f_i$ is evaluated by computing the mean error score over the validation dataset. The same validation dataset may be used to evaluate the performance of each iteration of the keypoint estimation network. For example, the validation dataset may be a set of real world images from the real world dataset 404 that is reserved for validation purposes. The validation performance of the updated keypoint estimation network $f_i$ may be evaluated by computing the mean error score as described above (e.g., by computing the mean MPJPE averaged over the validation dataset).

At 520, if the mean error score of the updated keypoint estimation network $f_i$ is worse (e.g., the mean error score is higher) than the mean error score of the prior-iteration keypoint estimation network $f_{i-1}$, the updated keypoint estimation network $f_i$ is replaced with the network architecture of the prior-iteration keypoint estimation network $f_{i-1}$. The replaced architecture of the updated keypoint estimation network $f_i$ is trained again using the combined dataset 402.

If the mean error score of the updated keypoint estimation network $f_i$ is equal to or better than that of the prior-iteration keypoint estimation network $f_{i-1}$, step 520 may be omitted. Step 520 may help to ensure that the performance of the keypoint estimation network improves (or at least does not worsen) in each training iteration.

If the mean error score (computed at step 518) has not converged, then the method 500 proceeds to step 522

At 522, the iteration count i is increased by one (i.e., i=i+1), and the synthetic dataset 406 is reset. The result is that the updated keypoint estimation network $f_i$ becomes the prior-iteration keypoint estimation network $f_{i-1}$ for the next training iteration, and the previously generated synthetic images are discarded. That is, in each training iteration, a new set of synthetic images is generated for the synthetic dataset 406 (however the real world images in the real world dataset 404 are unchanged in each iteration).

The method 500 then returns to step 506 to obtain a new set of synthetic images for the synthetic dataset 406 and to train a new updated keypoint estimation network $f_i$.

If the mean error score (computed at step 518) has converged (e.g., is not significantly smaller (such as at least 5% smaller) than the mean error score computed in the prior iteration), then the method 500 proceeds to optional step 524. Other methods of determining whether the mean error score has converged may be used (e.g., comparing variation in the mean error score over a defined number of previous iterations). It should be noted that various different convergence criteria may be used, which may or may not be dependent on computation of the mean error score. For example, another convergence criteria may be whether a maximum number of iterations has been reached (e.g., whether the iteration count i is at or above a predefined maximum value). In another example, a combination of convergence criteria may be used. Regardless of how convergence is determined, if the convergence criteria is not satisfied the method 500 proceeds to step 522; if the convergence criteria is satisfied, the method 500 proceeds to optional step 524.

If the convergence criteria is determined to be satisfied, the updated keypoint estimation network $f_i$ is considered to be the trained final keypoint estimation network, denoted $f_L$.

Optionally, at 524, the final keypoint estimation network $f_L$ may be fine-tuned using real world images (e.g., from the real world dataset 404). Fine-tuning of the final keypoint estimation network $f_L$ may be performed using any suitable training technique (e.g., by computing a loss between predicted keypoints and ground-truth keypoints, then updating parameters of the final keypoint estimation network $f_L$ by backpropagating the loss gradient). However, to avoid excessive changes to the parameters of the final keypoint estimation network $f_L$, the training performed at the fine-tuning step may update only the parameters (e.g., weight values) of the last one or two layers of the final keypoint estimation network $f_L$ and/or may be performed using a smaller gradient (i.e., reducing the learning rate). Various techniques have been developed for fine-tuning already-trained neural networks, any of which may be suitable for this fine-tuning step.

After fine-tuning, the performance of the fine-tuned final keypoint estimation network $f_L$ on the validation dataset (e.g., the performance as quantified by the mean error score, such as the mean MPJPE score) is compared to the performance of the final keypoint estimation network $f_L$ prior to fine-tuning. If the fine-tuned version of the final keypoint estimation network $f_L$ has a better performance (e.g., a lower mean error score), then the fine-tuned final keypoint estimation network $f_L$ is used as the final keypoint estimation network $f_L$. Otherwise, the previous version of the final keypoint estimation network $f_L$ (i.e., prior to fine-tuning) is used.

At 526, the final keypoint estimation network $f_L$ is stored. For example, the trained parameters (e.g., the final trained weight values) of the final keypoint estimation network $f_L$ may be stored, as well as the architecture of the final keypoint estimation network $f_L$. If the final keypoint estimation network $f_L$ is to be used by another computing system (e.g., an end consumer computing device or edge computing device) for inference, the parameters and architecture of the final keypoint estimation network $f_L$ may be outputted to the other computing system. The final keypoint estimation network h may be deployed (e.g., executed using the stored or outputted parameters) for keypoint estimation in inference (e.g., inference on real world images during deployment).

Optionally, at 528, the synthetic dataset 406 that was generated in the last iteration of training may be stored. The synthetic images in the synthetic dataset 406 have been filtered (at step 510) to help ensure the quality of the images in the synthetic dataset 406. Accordingly, the synthetic dataset 406 may be a repository of good quality synthetic images that may be used to augment the real world dataset 404 or other collection of real world images. The resulting augmented dataset may be used for any suitable training task, for example.

In the above discussion, computation of a mean error score (e.g., mean MPJPE score) is used to validate the performance of the keypoint estimation network in each training iteration, and optionally to validate the performance of a fine-tuned keypoint estimation network. However, it should be understood that other techniques may be used to evaluate performance of the keypoint estimation network, and the present disclosure is not necessarily limited to the use of a mean error score for performance validation.

In various examples, the present disclosure has described methods and systems for training a keypoint estimation network, using an augmented training dataset (e.g., using real world images of a real world dataset combined with synthetic images of a synthetic dataset). The synthetic images are generated by a generator.

The present disclosure has described example cGAN architectures that may be used to train the generator to generate synthetic images conditioned on a set of keypoints. However, it should be understood that the iterative training of the keypoint estimation network may be performed using other generators capable of generating synthetic images containing keypoint information.

Training of the keypoint estimation network is performed iteratively, where the prior-iteration keypoint estimation network is used to filter out poor quality synthetic images before training the updated keypoint estimation network. This helps to ensure that the keypoint estimation network is trained on good quality synthetic images.

The training of the keypoint estimation network also results in a set of good quality synthetic images, which may be used to augment real world images in any future training task. The synthetic images are automatically annotated with assigned keypoints, thus foregoing the need for expensive human manual annotation.

As previously mentioned, the examples disclosed herein may be used to obtain a trained keypoint estimation network for performing various types of keypoint (or pose) estimation tasks, including hand pose estimation, body pose estimation, vehicle pose estimation, and facial landmark estimation, among others.

Although the present disclosure describes methods and processes with steps in a certain order, one or more steps of the methods and processes may be omitted or altered as appropriate. One or more steps may take place in an order other than that in which they are described, as appropriate.

Although the present disclosure is described, at least in part, in terms of methods, a person of ordinary skill in the art will understand that the present disclosure is also directed to the various components for performing at least some of the aspects and features of the described methods, be it by way of hardware components, software or any combination of the two. Accordingly, the technical solution of the present disclosure may be embodied in the form of a software product. A suitable software product may be stored in a pre-recorded storage device or other similar non-volatile or non-transitory computer readable medium, including DVDs, CD-ROMs, USB flash disk, a removable hard disk, or other storage media, for example. The software product includes instructions tangibly stored thereon that enable a computing system to execute examples of the methods disclosed herein. The machine-executable instructions may be in the form of code sequences, configuration information, or other data, which, when executed, cause a machine (e.g., a processor or other processing unit) to perform steps in a method according to examples of the present disclosure.

The present disclosure may be embodied in other specific forms without departing from the subject matter of the claims. The described example embodiments are to be considered in all respects as being only illustrative and not restrictive. Selected features from one or more of the above-described embodiments may be combined to create alternative embodiments not explicitly described, features suitable for such combinations being understood within the scope of this disclosure.

All values and sub-ranges within disclosed ranges are also disclosed. Also, although the systems, devices and processes disclosed and shown herein may comprise a specific number of elements/components, the systems, devices and assemblies could be modified to include additional or fewer of such elements/components. For example, although any of the elements/components disclosed may be referenced as being singular, the embodiments disclosed herein could be modified to include a plurality of such elements/components. The subject matter described herein intends to cover and embrace all suitable changes in technology.

The invention claimed is:

1. A method for training a keypoint estimation network, the method comprising:
    performing a plurality of training iterations, each training iteration comprising:
        obtaining a set of synthetic images generated by a generator, each synthetic image being assigned a respective set of assigned keypoints by the generator;

using a prior-iteration keypoint estimation network, obtaining a set of predicted keypoints for each synthetic image;

based on computation of an error score between the set of predicted keypoints and the respective set of assigned keypoints for each respective synthetic image:
identifying and discarding any synthetic image having an error score that fails a preset threshold; and
identifying and adding, to a synthetic dataset, any synthetic image having an error score that satisfies the preset threshold;

training an updated keypoint estimation network, using a combined dataset comprising the synthetic dataset combined with a real world dataset containing real world images; and computing a mean error score for the updated keypoint estimation network, the mean error score representing performance of the updated keypoint estimation network on a validation dataset;

wherein the training iterations are performed until a convergence criteria is satisfied; and storing the updated keypoint estimation network from a final training iteration as a final keypoint estimation network.

2. The method of claim 1, wherein the generator is a pre-trained generator, trained using a conditional generative adversarial network (cGAN), to generate a synthetic image conditioned on a set of keypoints sampled from the real world dataset.

3. The method of claim 1, wherein the generator comprises a pre-trained sub-generator, trained using a conditional generative adversarial network (cGAN), to generate a synthetic feature vector conditioned on a set of keypoints sampled from the real world dataset, the generator further comprising a decoder to reconstruct a synthetic image from the synthetic feature vector.

4. The method of claim 1, further comprising, for each training iteration:
comparing the mean error score for the updated keypoint estimation network with a mean error score computed for the prior-iteration keypoint estimation network; and
in response to a determination that the mean error score for the updated keypoint estimation network is greater than the mean error score for the prior-iteration keypoint estimation network:
replacing the updated keypoint estimation network with the prior-iteration keypoint estimation network; and
retraining the replaced updated keypoint estimation network using the combined dataset.

5. The method of claim 1, further comprising, for each training iteration:
based on computation of the error score between the set of predicted keypoints and the respective set of assigned keypoints for each respective synthetic image:
identifying any synthetic image having an error score that satisfies the preset threshold and is within a preset margin of the threshold;
replacing the set of assigned keypoints for the identified synthetic image with the set of predicted keypoints for the identified synthetic image; and
adding the identified synthetic image to the synthetic dataset.

6. The method of claim 1, further comprising:
fine-tuning the final keypoint estimation network using the real world dataset.

7. The method of claim 1, further comprising:
storing the combined dataset as an augmented training dataset.

8. The method of claim 1, further comprising:
prior to a first training iteration, training an initial keypoint estimation network using only real world images;
wherein the initial keypoint estimation network is used as the prior-iteration keypoint estimation network for the first training iteration.

9. The method of claim 1, wherein the convergence criteria is a convergence of the mean error score.

10. A device for training a keypoint estimation network, the device comprising a processing unit configured to execute instructions to cause the device to:
perform a plurality of training iterations, each training iteration comprising:
obtaining a set of synthetic images generated by a generator, each synthetic image being assigned a respective set of assigned keypoints by the generator;
using a prior-iteration keypoint estimation network, obtaining a set of predicted keypoints for each synthetic image;
based on computation of an error score between the set of predicted keypoints and the respective set of assigned keypoints for each respective synthetic image:
identifying and discarding any synthetic image having an error score that fails a preset threshold; and
identifying and adding, to a synthetic dataset, any synthetic image having an error score that satisfies the preset threshold;
training an updated keypoint estimation network, using a combined dataset comprising the synthetic dataset combined with a real world dataset containing real world images; and
computing a mean error score for the updated keypoint estimation network, the mean error score representing performance of the updated keypoint estimation network on a validation dataset;
wherein the training iterations are performed until a convergence criteria is satisfied; and
store the updated keypoint estimation network from a final training iteration as a final keypoint estimation network.

11. The device of claim 10, wherein the generator is a pre-trained generator, trained using a conditional generative adversarial network (cGAN), to generate a synthetic image conditioned on a set of keypoints sampled from the real world dataset.

12. The device of claim 10, wherein the generator comprises a pre-trained sub-generator, trained using a conditional generative adversarial network (cGAN), to generate a synthetic feature vector conditioned on a set of keypoints sampled from the real world dataset, the generator further comprising a decoder to reconstruct a synthetic image from the synthetic feature vector.

13. The device of claim 10, wherein the processing unit is further configured to execute the instructions to cause the device to, for each training iteration:
compare the mean error score for the updated keypoint estimation network with a mean error score computed for the prior-iteration keypoint estimation network; and
in response to a determination that the mean error score for the updated keypoint estimation network is greater than the mean error score for the prior-iteration keypoint estimation network:

replace the updated keypoint estimation network with the prior-iteration keypoint estimation network; and
retrain the replaced updated keypoint estimation network using the combined dataset.

14. The device of claim 10, wherein the processing unit is further configured to execute the instructions to cause the device to, for each training iteration:
based on computation of the error score between the set of predicted keypoints and the respective set of assigned keypoints for each respective synthetic image:
identify any synthetic image having an error score that satisfies the preset threshold and is within a preset margin of the threshold;
replace the set of assigned keypoints for the identified synthetic image with the set of predicted keypoints for the identified synthetic image; and
add the identified synthetic image to the synthetic dataset.

15. The device of claim 10, wherein the processing unit is further configured to execute the instructions to cause the device to:
fine-tune the final keypoint estimation network using the real world dataset.

16. The device of claim 10, wherein the processing unit is further configured to execute the instructions to cause the device to:
store the combined dataset as an augmented training dataset.

17. The device of claim 10, wherein the processing unit is further configured to execute the instructions to cause the device to:
prior to a first training iteration, train an initial keypoint estimation network using only real world images;
wherein the initial keypoint estimation network is used as the prior-iteration keypoint estimation network for the first training iteration.

18. The device of claim 10, wherein the convergence criteria is a convergence of the mean error score.

19. A non-transitory computer readable medium storing instructions thereon, wherein the instructions, when executed by a processing unit of a device, cause the device to:
perform a plurality of training iterations, each training iteration comprising:
obtaining a set of synthetic images generated by a generator, each synthetic image being assigned a respective set of assigned keypoints by the generator;
using a prior-iteration keypoint estimation network, obtaining a set of predicted keypoints for each synthetic image;
based on computation of an error score between the set of predicted keypoints and the respective set of assigned keypoints for each respective synthetic image:
identifying and discarding any synthetic image having an error score that fails a preset threshold; and
identifying and adding, to a synthetic dataset, any synthetic image having an error score that satisfies the preset threshold;
training an updated keypoint estimation network, using a combined dataset comprising the synthetic dataset combined with a real world dataset containing real world images; and
computing a mean error score for the updated keypoint estimation network, the mean error score representing performance of the updated keypoint estimation network on a validation dataset;
wherein the training iterations are performed until a convergence criteria is satisfied; and
store the updated keypoint estimation network from a final training iteration as a final keypoint estimation network.

20. The non-transitory computer readable medium of claim 19, wherein the generator is a pre-trained generator, trained using a conditional generative adversarial network (cGAN), to generate a synthetic image conditioned on a set of keypoints sampled from the real world dataset.

* * * * *